(12) United States Patent
Shimakawa et al.

(10) Patent No.: US 6,502,124 B1
(45) Date of Patent: Dec. 31, 2002

(54) METHOD OF AND APPARATUS FOR MANAGING LICENSED SOFTWARE

(75) Inventors: Takuya Shimakawa, Kawasaki; Satoru Matsumoto, Yokohama; Makoto Kitagawa, Fujisawa; Motoaki Hirabayashi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/964,132

(22) Filed: Nov. 6, 1997

(30) Foreign Application Priority Data

Nov. 11, 1996 (JP) .............................. 8-298466

(51) Int. Cl.[7] .............................................. G06F 13/00
(52) U.S. Cl. ..................................................... 709/203
(58) Field of Search ............................... 709/201, 203, 709/217, 218, 219; 705/58, 59

(56) References Cited

U.S. PATENT DOCUMENTS

| | | | | |
|---|---|---|---|---|
| 5,287,408 A | * | 2/1994 | Samson | 705/59 |
| 5,375,206 A | * | 12/1994 | Hunter et al. | 717/11 |
| 5,530,752 A | * | 6/1996 | Rubin | 705/59 |
| 5,671,412 A | * | 9/1997 | Christiano | 707/104.1 |
| 5,758,069 A | * | 5/1998 | Olsen | 713/201 |
| 5,790,664 A | * | 8/1998 | Coley | 709/203 |
| 5,881,236 A | * | 3/1999 | Dickey | 709/221 |
| 5,930,357 A | * | 7/1999 | Fukui | 705/59 |
| 6,067,582 A | * | 5/2000 | Smith | 710/5 |

FOREIGN PATENT DOCUMENTS

| | | |
|---|---|---|
| JP | 6-309261 | 4/1994 |
| JP | 7-146831 | 6/1995 |
| JP | 7-334436 | 12/1995 |
| JP | 8-030441 | 2/1996 |
| JP | 8-076979 | 3/1996 |

* cited by examiner

*Primary Examiner*—Moustafa M. Meky
(74) *Attorney, Agent, or Firm*—Mattingly, Stanger & Malur, P.C.

(57) ABSTRACT

A software install management method, and an apparatus for the method, can prevent a greater number of softwares than a contracted license number from being installed in a server-client system. A serve comprises a software management portion for saving a software to be installed in a software storage portion, a table management portion for registering an information representing an install history of the software saved in the software storage portion and an information representing a license number to a history management table and to a license number management table, respectively, and a software transmission portion for transmitting the software to the client, and client comprises a software management portion for judging whether or not the software saved in the server is to be installed, a software reception portion for receiving the software transmitted from the server and storing it in a software storage portion, and a table management portion for registering an information representing the software saved in the software storage portion t a management table.

16 Claims, 9 Drawing Sheets

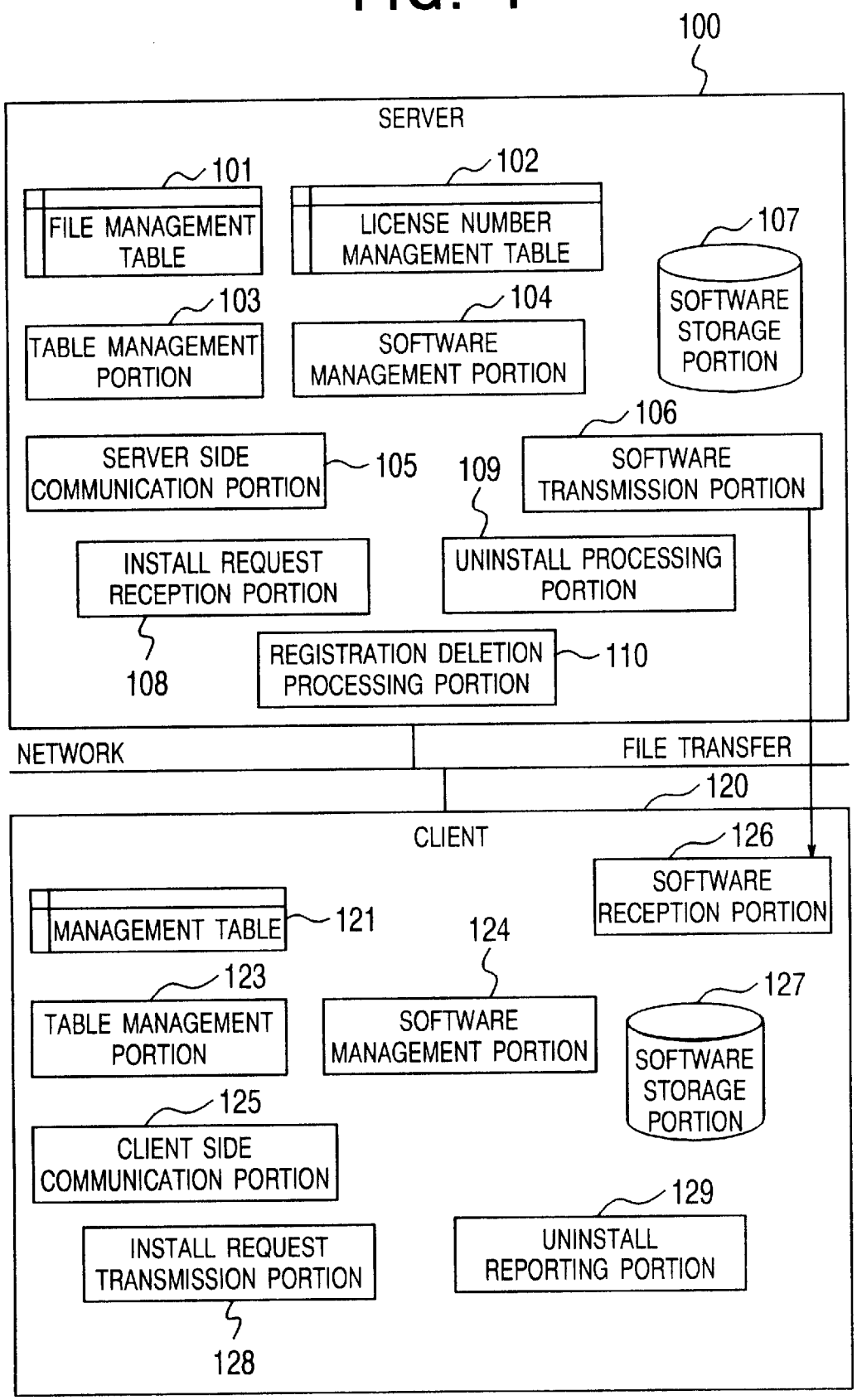

FIG. 2

101 HISTORY MANAGEMENT TABLE OF SERVER

| 201 SOFTWARE NAME | 202 VERSION INFO | 203 COMPUTER NAME | 204 INSTALL DATE/TIME | 205 UNINSTALL DATE/TIME | 206 INSTALL STATUS | 207 REGISTRATION INFO |
|---|---|---|---|---|---|---|
| soft1 | ver.1.0 | computer1 | 1996.5.2 / 11:00 | 0 | 1 | 1 |
| ⋮ | ⋮ | ⋮ | ⋮ | ⋮ | ⋮ | ⋮ |

FIG. 3

102 LICENSE NUMBER MANAGEMENT TABLE OF SERVER

| 301 SOFTWARE NAME | 302 VERSION INFO | 303 DISK CAPACITY | 304 LICENSE NUMBER | 305 INSTALLED LICENSE NUMBER |
|---|---|---|---|---|
| soft1 | ver.1.0 | 80 | 19 | 3 |
| ⋮ | ⋮ | ⋮ | ⋮ | ⋮ |

FIG. 4

121 MANAGEMENT TABLE OF CLIENT

| 401 SOFTWARE NAME | 402 VERSION INFO | 403 INSTALL DATE/TIME | 404 UNINSTALL DATE/TIME | 405 STATUS INFO |
|---|---|---|---|---|
| soft1 | ver.1.0 | 1996.5.2 / 11:00 | 0 | 1 |
| ⋮ | ⋮ | ⋮ | ⋮ | ⋮ |

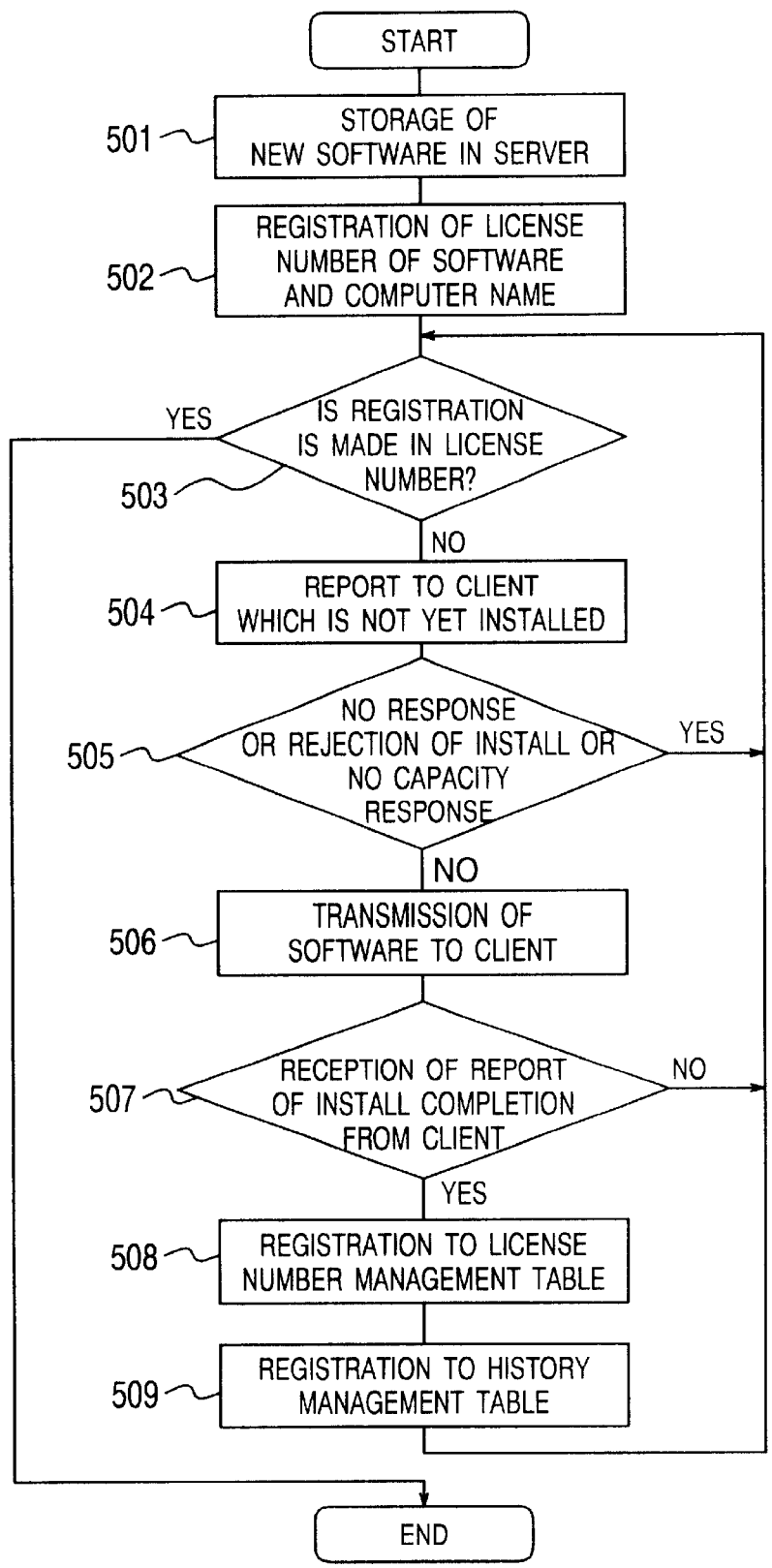

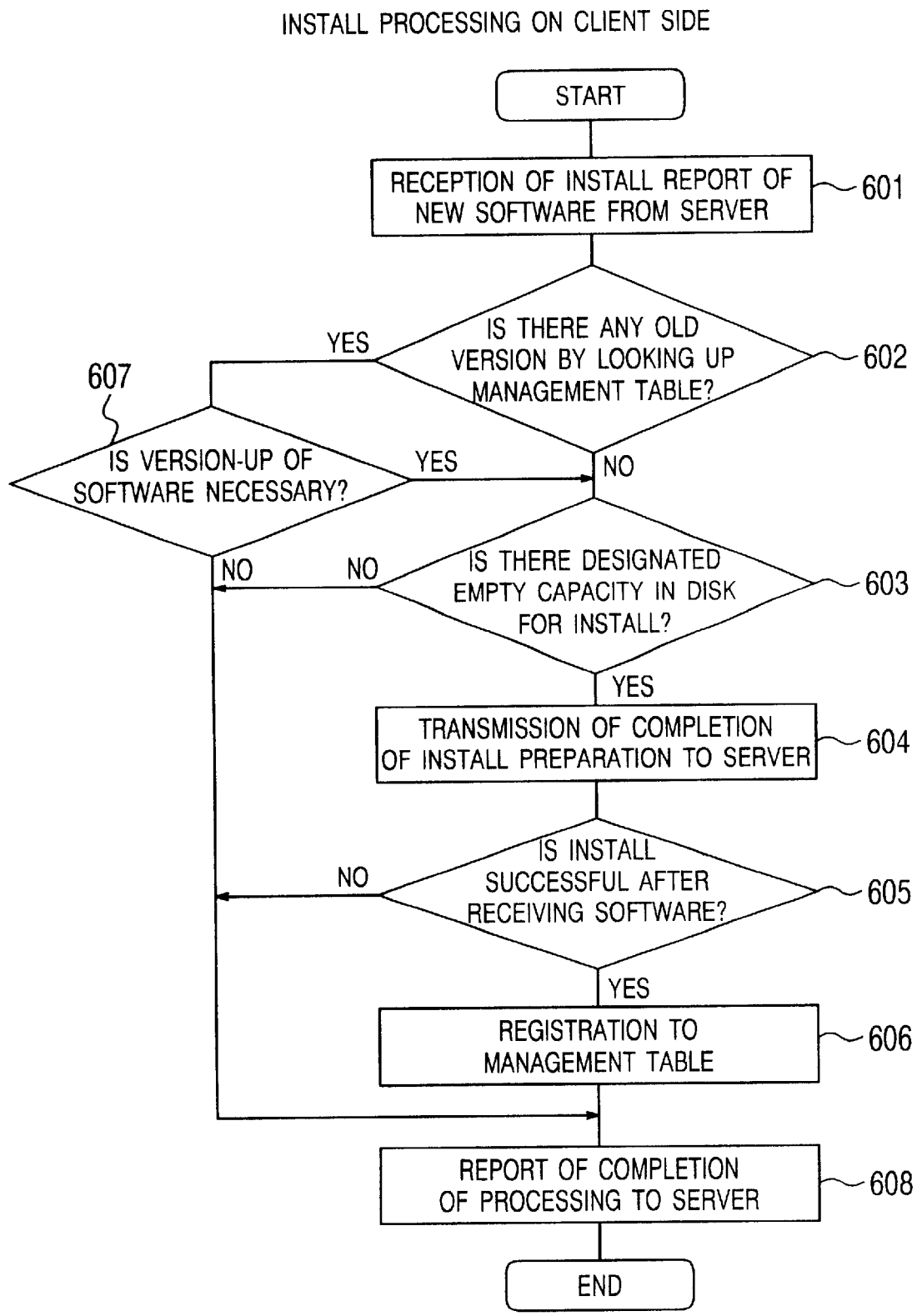

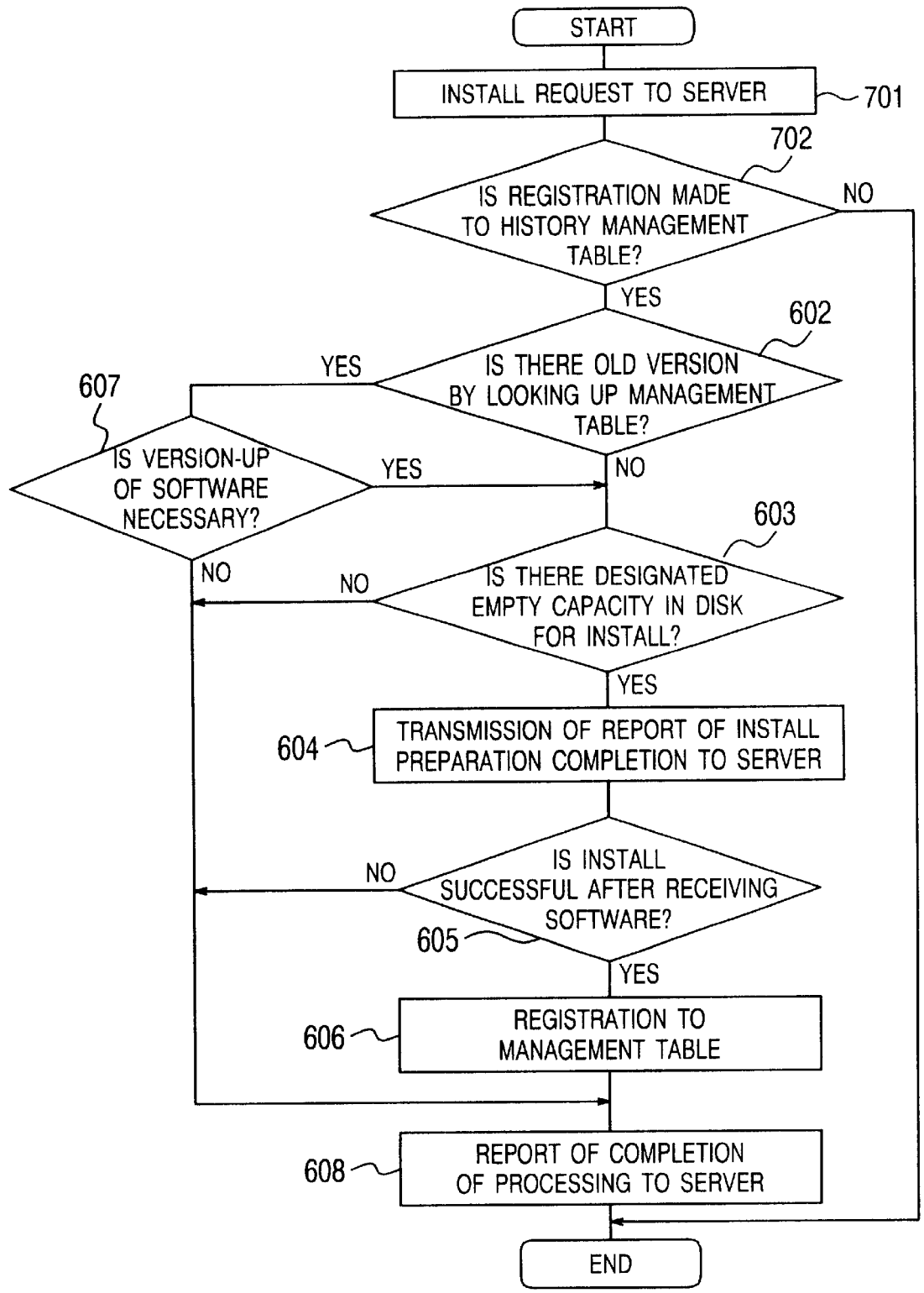

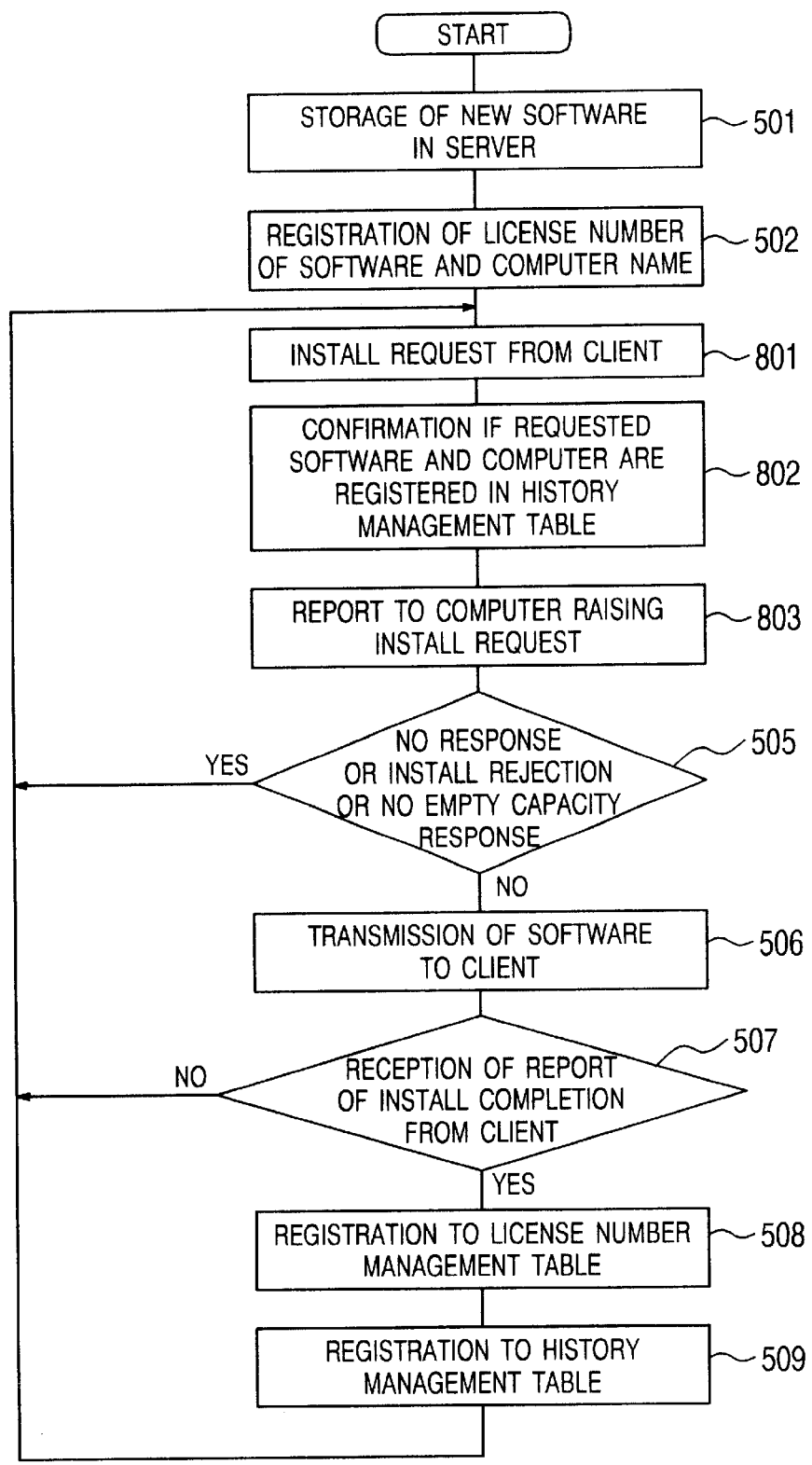

UNINSTALL PROCESSING ON CLIENT SIDE

UNINSTALL PROCESSING ON SERVER SIDE

METHOD OF AND APPARATUS FOR MANAGING LICENSED SOFTWARE

BACKGROUND OF THE INVENTION

This invention relates to a method of, and an apparatus for, managing a licensed software. More particularly, this invention relates to a software management method and apparatus for installing a software registered to a computer functioning as a server to a computer functioning as a client through a network.

When a given software is installed to a computer, it has been customary to set a portable storage medium such as an FD (floppy disk), a CD-ROM (compact disk-ROM), etc, to a computer and to execute an install processing.

Recently, the method of installing softwares has been changing from the method described above which sets the portable storage medium such as the FD, the CD-ROM, etc, to the computer and then installs the software to a method which installs the software by transmitting it from a server as a computer to which the software is registered to a client as a computer to which the software is to be installed, through a network.

JP-A-7-146831 (NEC) describes a terminal software automatic and simultaneous updating system which can update automatically and all at once a new software on a designated date and time in each terminal equipment without passing through an operator by storing in advance software updating information and an updating software of a plurality of terminal equipments from a host computer to each terminal equipment.

In a plurality of terminal equipments connected to the host computer through a communication line in this system, each terminal equipment includes updating information registration confirmation means, updating procedure generation means, updating procedure activation means, an updating information table, a software information table, a new software file, a current software file, an updating procedure information file and a system date/time management means.

JP-A-6-309261 (Mitsubishi) describes a software automatic install method and a software automatic version-up method which can install or can version up a software without inviting a security problem for all the client machines inside a system by executing once an install operation from a server machine.

In this method, the server machine generates a command to the client machine to install the software and when the client machine receives the request from the server machine, it installs the software transferred from the server machine, and sends the message of install completion to the server machine after install is completed. When this message arrives from the client machine, the server machine reports that the software is installed to all the client machines.

A software automatic distribution method for easily and reliably accomplishing distribution of a software to a plurality of computers connected to a network is described in JP-A-334436 (Mitsubishi).

According to this method, a load detection portion is provided to each of the host computer as a transmission source of the software and a relay host computer so as to detect a communication loadage, and transmission of the software is executed when the communication loadage of the network is relatively small. Further, after this software is divided into a transmission unit smaller than a predetermined size by a division portion, the possibility of distribution failure due to troubles in the network, etc, is reduced. The software as the distribution object and its set information are put together into one package and are managed so that unitary management of the software can be made.

A program management method which makes it possible to execute version management of a software when the software is used in computers connected by a network is described in JP-A-8-76979 (Toshiba).

In the computers connected by the network, this method comprises a comparison step of comparing a version file saved by a server with a version file saved by a client, a transfer step of automatically transferring the software on the server side to the client side and an updating step of updating the version file on the client side on the basis of the content of the software so transferred.

A network system for allowing a work station used by each user to easily install a software is described in JP-A-8-30441 (Matsushita).

In this system, a write portion for install judges which of the file of a file server and the file of the work station is newer on the basis of the date attribute of the file, and when the file of the work station is judged as newer, this file is written into the file server and the file so written is stored in other work stations.

Nonetheless, the prior art technologies described above are not yet free from the following drawbacks.

In the conventional install method of the software through the network, the server does not manage the information of the software installed to the client. It is therefore not clear to which of the clients the software has been installed, and there is the possibility that the software is installed to a greater number of clients than the contracted license number.

In the conventional software install method through the network, the user can freely install the software through the network. Therefore, it is not clear for the server which software is installed to which clients, so that illegal copy cannot be prevented. Particularly in the case of copy of the software through the internet, copy is made through a proxy server and for this reason, a requester cannot be known.

Further, in the conventional software install method through the network, the server does not have means for supervising uninstall of the software. Therefore, the license number cannot be managed when the client uninstalls the software.

In the conventional software install method through the network, there is no management method which removes a client, which installs a certain software, from the network and installs the software to other clients.

SUMMARY OF THE INVENTION

It is an object of the present invention to provide a method of, and an apparatus for, managing a software which can prevent a software from being installed to a greater number of clients than a contracted license number.

It is another object of the present invention to provide a method of, and an apparatus for, managing a software which can install the newest software to clients.

It is another object of the present invention to provide a method of, and an apparatus for, managing a software which can re-install a software, whenever necessary.

It is a further object of the present invention to provide a method of, and an apparatus for, managing a software which can efficiently manage a contracted license number of the softwares in a serverclient system under a closed environment.

The above and other objects and novel features of the present invention will become more apparent from the following description of the specification when taken in conjunction with the accompanying drawings.

Among the inventions disclosed in the present application, the following will illustrate some typical embodiments.

(1) In a software management apparatus for managing a software installed from a server to a client through a network, the server stores information representing the history of install of the software and information representing the license number of the software, and manages the license number of the softwares installed to the clients.

(2) The server saves the new software to be installed to the client in a software storage portion by a software management portion and registers the name or names of the clients to which the software is installed, in a history management table.

The software management portion of the server registers a disk capacity occupied by the software and the license number for which install is permitted, to a license number management table.

Next, a software transmission portion of the server registers the software saved in the software storage portion to the history management table or transmits it to the client(s).

The client judges whether or not the software saved in the server should be installed, by the software management portion, receives the software transmitted from the server by its software reception portion, and stores it into its own software storage portion.

The table management portion of the client registers the date and time of install of the software stored in the software storage portion to a management table.

When the install operation in the client is completed, the software management portion of the server stores the install date and time to the history management table and the installed license number to the license number management table. Instead, the software can be stored to the client designated from the server side by a multi-cast method.

According to the software management apparatus described above, the server manages the license number of the software installed to the clients. Therefore, it becomes possible to prevent a greater number of the software than the contacted license number from being installed.

(2) In the software management apparatus of the embodiment (1), the server notifies to the clients, to which install of the software is not yet made, that a new software is saved in the software storage portion.

When the new software is saved in the software storage portion, a server side communication portion of the server examines all the license number, to which install is permitted, and the license number, which is licensed, in the license number management table.

When there is a margin in the license number in the license number management table, the server side communication portion of the server looks up the history management table, searches the clients to which the new software is not yet installed, and notifies to the uninstalled clients searched that the new software is saved.

When a client side communication portion of the client receives the report from the server as described above, an empty capacity of the software storage portion is examined and when a sufficient empty capacity is found existing, a response representing completion of install preparation is transmitted.

Receiving the response representing completion of install preparation from the client, the server transmits the software saved in the software storage portion by its software transmission portion.

When install in the client is completed, the software management portion of the server stores the install date and time in the history management table and at the same time, registers a new installed license number to the license number management table.

According to the software management apparatus described above, the server reports to the client when the software is registered to the server. Therefore, the newest software can be installed to the client.

(3) In the software management apparatus described in the embodiment (1) or (2), the client requests the server to install the software, whenever necessary.

When re-install becomes necessary due to troubles or for other reasons, the client requests the server to install the software by its install request transmission portion.

Receiving the install request report from the client through the install request reception portion, the server examines whether or not the client raising the install request is registered to the history management table.

When this client is registered to the history management table, the software transmission portion of the server transmits the software saved in the software storage portion to the client.

According to the software management apparatus described above, install of the software is executed by the install request from the client. Therefore, reinstall of the software can be made, whenever necessary.

(4) In the software management apparatus described in the embodiments (1) to 93), when the client uninstalls the software installed thereto, the client reports this uninstall of the software to the server.

When uninstall is made in the client by deleting the specific software designated by the user, the software management portion of the client registers the date and time of uninstall to its own management table.

Next, the uninstall reporting portion of the client transmits an uninstall report to the server that the designated software is uninstalled.

Receiving the uninstall report from the client, an uninstall processing portion of the server registers the date and time of uninstall transmitted from the client to the history management table.

Next, the uninstall processing portion of the server instructs a system manager to decrement by "1" the installed license number of the corresponding softwares of the license number management table, and to register new clients.

According to the software management apparatus described above, the license number of the contracted softwares can be efficiently managed because the installed license number is decremented when uninstall is made.

(5) In the software management apparatus of the server-client system described in the embodiments (1) to (4), the server deletes registration of the client removed from the network.

When the specific client is removed from the network connecting the server and the clients, the system manager inputs the name of the client removed from the network to the server.

A registration deletion processing portion of the server confirms that the client is not connected to the client and then sets registration information representing that the client is not connected to the network, to the history management table.

Next, the installed license number in the license number management table of the software installed to the client is decremented by "1".

When the client is removed from the network without uninstalling the software in the software management apparatus described above, the computer name is inputted to the server to delete registration in relation to the client removed, and other computer names can be registered. Therefore, the license number of the contracted softwares can be efficiently managed.

Other objects, features and advantage of the present invention will become more apparent from reading the description of the following embodiments of the invention taken in conjunction with the accompanying drawings.

BRIEF DESCRIPTION OF THE DRAWINGS

FIG. 1 is a block diagram showing the schematic construction of a software management apparatus according to an embodiment of the present invention;

FIG. 2 is a diagram showing the outline of a history management table 101 of a server 100 of the software management apparatus of the embodiment of the present invention;

FIG. 3 is a diagram showing the outline of a license number management table 102 of the server 100 of the software management apparatus of the embodiment o the present invention;

FIG. 4 is a diagram showing the outline of a management table 121 of a client 102 of the software management apparatus of the embodiment of the present invention;

FIG. 5 is a flowchart showing a processing procedure of an install processing of the server 100 of the software management apparatus of the embodiment of the present invention;

FIG. 6 is a flowchart showing a processing procedure of an install processing of the client 120 of the software management apparatus of the embodiment of the present invention;

FIG. 7 is a flowchart showing a processing procedure of an install processing of the client 120 transmitting an install request in the software management apparatus of the embodiment of the invention;

FIG. 8 is a flowchart showing a processing procedure of an install processing of the server 100 receiving an install request in the software management apparatus of the embodiment of the present invention;

DESCRIPTION OF THE PREFERRED EMBODIMENTS

Figure 9:
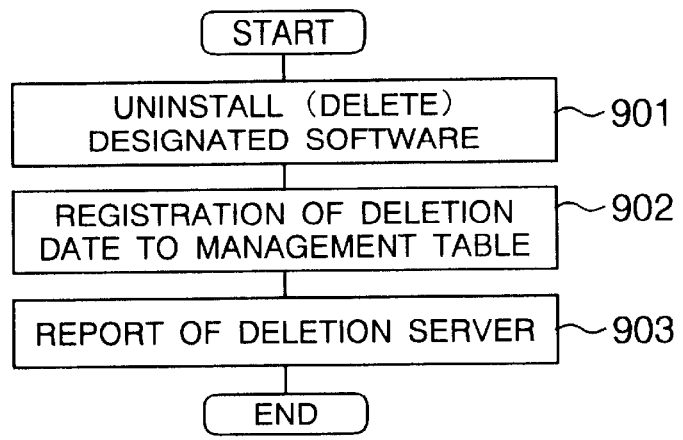
FIG. 9 is a flowchart showing a processing procedure of an uninstall processing of the client 120 in the software management apparatus of the embodiment of the invention.

Hereinafter, a software management apparatus for managing a software installed from a server to a client through a network in a software management apparatus according to one embodiment of the present invention will be explained.

As shown in FIG. 1, a software management apparatus according to an embodiment of the present invention includes a serve 100, a history management table 101, a license number management table 102, a table management portion 103, a software management portion 104, a server side communication portion 105, a software transmission portion 106, a software storage portion 107, an install request reception portion 108, an uninstall processing portion 109, a registration deletion processing portion 110, a client 120, a management table 1211, a table management portion 123, a software management portion 124, a client side communication portion 125, a software reception portion 126, a software storage portion 127, an uninstall request transmission portion 128 and an uninstall reporting portion 129.

In the software management apparatus described above, the server 100 as a computer for managing a license number of the softwares and the client 120 as a computer, to which the software whose license number is managed is installed, are connected to each other through a network.

Though only one each server 100 and client 120 are shown connected in the network in FIG. 1 so as to simplify the explanation, a plurality of servers 100 and a plurality of clients 120 are connected in practice to the network.

The server 100 of the software management apparatus includes the history management table 101, the license number management table 120, the table management table 103, the software management portion 104, the server side communication portion 105, the software transmission portion 106, the software storage portion 107, the install request reception portion 108, the uninstall processing portion 109 and the registration deletion processing portion 110.

The history management table 101 of the server 100 is a table for registering the information representing the install history of the software, which is saved in the software storage portion 107 and is installed to the client 120, and will be explained later in further detail with reference to FIG. 2.

The license number management table 102 is a table for registering the information of the license number of the softwares which are saved in the software storage portion 107 and will be explained later in further detail with reference to FIG. 3.

The table management portion 103 is a management portion for registering the information such as the install history, the license number, etc, to the history management table 101 and to the license number management table 102 when a new software is registered to the server 100 and when install of the software is made to the client.

The software management portion 104 is a management portion for saving a software, which is newly registered to the server 100, to the software storage portion 107 and the software to be installed to the client 120.

The server side communication portion 105 is a processing portion for reporting registration to the client 120 when the new software is registered to the server 100.

The software transmission portion 106 is a transmission portion for transmitting the software from the software storage portion 107 t the client 120 when the software is installed to the client 120.

The software storage portion 107 is a storage medium such as a hard disk for saving the software registered to the server 100.

The install request reception portion 108 is a reception portion for receiving an install request from the client 120.

The uninstall processing portion 109 is a processing portion for changing the registration contents of the history management table 101 and the license number management table 102 when uninstall for deleting the installed software is made in the client 120.

The registration deletion processing portion 110 is a processing portion for changing the registration contents of the history management table 101 and the license number management table 102 by not counting the softwares, which have been installed to the clients 120, as the license number when the client 120 si removed from the network.

The client 120 includes the management table 121, the table management portion 123, the software management portion 124, the client side communication portion 125, the software reception portion 126, the software storage portion 127, the install request transmission portion 128 and the uninstall reporting portion 129.

The management table 121 of the client 120 is a table for registering the information representing the software installed to the client 20, and will be explained later with reference to FIG. 4.

The table management portion 123 is a management portion for registering the information of the software installed to the client 120 to the management table 121.

The software management portion 124 is a management portion for judging whether or not the new software registered to the sever 100 is stored in the software storage portion 127.

The client side communication portion 125 is a processing portion for receiving the report transmitted from the server 100 when the new software is registered to the server 100.

The software reception portion 126 is a processing portion for receiving the software from the server 100 and storing it in the software storage portion 127.

The software storage portion 127 is a storage medium such as a hard disk for storing the installed software.

The uninstall reporting portion 129 is a processing portion for deleting the installed software and transmitting this uninstall to the server 100.

FIG. 2 shows an example of the data format of the history management table 101 of the server 100. This history management table 101 includes a software name 201, version information 202, a computer name 203, an install date/time 204, an uninstall date/time 205, install status 206 and registration information 207.

As shown in FIG. 2, when a new software is registered in the history management table 101 of the server 100, the table management portion 103 registers the software name 201, the version information 202 and the computer name 203 and their formats are expressed by using character strings such as alphabets, Kanji characters, etc, such as "soft1", "ver. 1.0", "computer1", etc.

The software name 201, the version information 202 and the computer name 203 registered to the history management table 101 by the table management portion 103 of the server 100 are once stored in the software storage portion 107 and are then inputted by the user from an input device such a keyboard.

The install date/time 204 and the uninstall date/time 205 of the history management table 101 are expressed by numerals and symbols representing the year, month and day and time such as "1996. 5. 2/11;00", and they are expressed by "0" before install or uninstall is made, respectively.

The install status 206 of the history management table 101 expresses the information representing the install status of the software by numerals "0", "1", "2" or "3", wherein "0" represents "not-yet-installed", "1" represents "installed", "2" represents "uninstalled" and "3" represents "version-up is made".

The regi stration information 207 of the history management table 101 expresses by "0" or "1" whether or not the client 120 to which the software is installed exists in the n etwork. In other words, "0" represents that the client 120 does not exist in the network. In this instance, which client corresponds to this case can be identified on the basis of a unique name.

In FIG. 3, the license number management table 102 includes the software name 301, the version information 302, the disk capacity 303, the license number 304 and the installed license number 305.

As shown in FIG. 3, too, the software name 301 and th e version information 302 are expressed by a character string using alphabets or kanji characters such as "soft1", "ver.1.0", etc.

The disk capacity 303 of the license number management table 102 represents a disk occupying capacity of the software in the storage medium of the software storage portion 107 or in the software storage portion 127. It is expressed by an integer and its unit is MB (Mega Byte).

The license number 304 and the installed license number 305 of the license number management table 102 represent the license number of all the licenses permitted when using the software and the license number of all the softwares installed to the license 120, respectively, and they are expressed by integers such as "19" or '3'.

Here, the license number 304 and the installed license number 305 registered to the license number management table 102 may be the number of the computers which are permitted to install the software or the number of the users capable of executing the software. The object of install is not limited to the physical position of the apparatus, that is, the specified computer apparatus.

FIG. 4 shows the data format of the management table 121 of the client 120. In FIG. 4, the management table 121 includes the software name 401, the version information 402, the install date/time the uninstall date/time 404 and the install status 405.

As shown in FIG. 4, the software name 401 and the version information 402 in the management table 121 are expressed by the character strings using alphabets, Kanji characters, etc, such as "soft1" and "ver.1.0".

The install date/time 403 and the uninstall date/time 404 are expressed by numerals and symbols representing the year, month, day and time such as "1996, 5, 2/11;00" and they are expressed by "0" before install and uninstall are executed, respectively.

The install status 405 of the management table 121 is expressed by a numeral "0", "1", "2" or "03". "0" represents "not yet installed", "1" represents "installed", "2" represents "uninstalled" and "3" represents "version-up is made".

In the software management apparatus having the construction described above, the explanation will be given on the operations of the server 100 and the client 120 when registration of the new licensed software to the server 100 is reported from the server 100 to the client 120 and the software is installed to the client 120.

FIG. 5 is a flowchart showing a processing procedure of the install processing of the server 100 in this embodiment.

As shown in FIG. 5, the install processing of the server 100 represents the processing on the side of the server 100 when a new software is registered to the server 100 and the new software so registered is installed to the client 120.

In the server 100, the software management portion 104 first saves the new software in the software storage portion 107 by the processing at step 501.

At this time, the software management portion 104 of the server 100 registers the software name 201 and the version information 202 to the history management table 102 and the disk capacity 303 of the software to the license number management table 102.

Registration of the software name 301, the version information 202 and the disk capacity 303, which is executed by the software management portion 204 of the server 100, may be made either automatically or manually.

Here, the term "automatic registration" means that when the software is saved in the software storage portion 107, the software management portion 104 acquires the software name 201, the version information 202 and the disk capacity 303 from the software which is saved, and registers the software information so acquired to the history management table 101 and to the license number management table 102.

The term "manual registration" means that when the software is saved in the software storage portion 107, the user inputs the software name 201, the version information 202 and the disk capacity 303 from the input device such as the keyboard.

In the processing of the next step 502, the table management portion 103 of the server 100 inputs the computer name 203 to which the software is to be installed and the license number 304 of the software from the input device such as the keyboard, and registers the computer name 203 to the history management table 101 and the license number 304 to the license number management table 102.

At this time, all of the install date/time 204, the uninstall date/;time 205, the install status 206 and the installed license number 305 are set to "0".

Here, when the license number 304 is registered to the license number management table 102, registration is made by an authorized person such as a system manager. Alternatively, registration to the license number management table 102 is made by incorporating in advance the license number 304 into the software so that the table management portion 103 can read out the license number 304 in the software and can register it to the license management table 102 when the software is saved in the server 100.

Security is provided to the license number management table 102 of the server 100 lest the users other than the system manager and the programs other than the table management portion 103 arbitrarily change the software.

When registration of the new software is completed, the server side communication portion 105 compares the license number 304 with the installed license number 305 of the license number management table 102 at step 503 and examines whether or not the software of the contracted license number 304 such as an application program (AP) is registered to the client 120.

When the installed license number 305 is found equal to the license number 304 as a result of comparison of the license number 304 and the installed license number 305 of the license number management table 102 at step 503, the install processing of the server 100 is completed.

When the installed license number 305 is found smaller than the license number 304 as a result of the comparison of the license number 304 and the installed license number 305 of the license number management table 102 at step 503, the flow proceeds to the processing of step 504.

At step 504, the server side communication portion 105 looks up the history management table 101, searches the computer name 203 to which the new software is not yet installed, and reports to the client 120, which is so searched and to which the new software is not yet installed, that the new software is saved in the server 100.

Here, the report content reported from the server side communication portion 105 to the client 120 includes the software name 201, the version information 202, the disk capacity 303 and the name of the server 100.

In the processing at step 505, the server side communication portion 105 sets time-out, waits for the response from the client 120, receives install rejection, no empty capacity or other error codes from the client 120, or searches the next computer name 203, to which the software is not yet installed, by the history management table 101 when no response is given from the client 120, and then returns to the processing of the step 503.

When the server side communication portion 105 receives the response representing completion of preparation for the install processing from the client 120 at step 505, the flow proceeds to step 506, at which the software transmission portion 106 transmits the software saved in the software storage portion 107 to the client 120.

At step 507, the server side communication portion 105 waits for the response from the client 120, and when it receives the report of install completion from the client 120, the flow proceeds to step 508.

Here, the content of the install completion report transmitted from the client 120 includes the name of the software installed, the version, the name of the client 120 and the install date and time.

At step 508, the table management portion 103 increments by "1" the installed license number 305 in the license number management table 102 that corresponds to the name of the software and the version represented by the install completion report which is received from the client 120.

At step 509, the table management portion 103 registers the date and time of install represented by the install completion report to the install date/time 204 in the history management table 101 corresponding to the name of the software, the version and the name of the client 120 represented by the install completion report received from the client 120, and then sets "1" representing install completion to the install status 206.

FIG. 6 is a flowchart showing the processing procedure of the install processing of the client 120 of the software management apparatus of this embodiment.

As shown in FIG. 6, the install processing of the client 120 represents the processing on the side of the client 120 when the new software is registered to the server 100 and the new software so registered is installed to the client 120.

First, the client side communication portion 125 receives a signal representing that the new software is saved in the server 100, at step 601.

At step 602, the software management portion 124 looks up its own management table 121 and examines whether or not the same software but of the old version as the new software saved in the server 100 is installed to the client 120 from the software name 401 and the version information 402.

When the same software as the new software saved in the server 100 is not found installed to the software storage portion 127 of the client 120 as a result of reference to the management table 121 at step 602, the flow proceeds to step 603.

When the same software as the new software saved in the server 100 is found installed to the client 120 as a result of reference to the management table 121 at step 602, the flow proceeds to step 607.

At step 607, the software management portion 124 examines whether or not version-up of the software is to be made. When version-up of the software is made, the flow proceeds to step 603 and when it is not made, the flow proceeds to step 608.

Judgement as to whether or not this version-up is made may be made by setting in advance the information representing approval/rejection of version-up and referring to this information, or version-up may be made when the software for which version-up is made is under the write permitted state.

At step 603, the software management portion 124 examines the empty capacity of the software storage portion 127 of the client 120. When the designated empty capacity exists in the disk for install, the flow proceeds to step 604 and when it does not, the flow proceeds to step 608.

At step 604, the client side communication portion 125 transmits the response representing preparation completion of the install processing to the server 100.

At step 605, the software reception portion 126 receives the software from the server 100, stores it in the software storage portion 127 and examines whether or not install proves successful.

When install proves successful at step 605, the flow proceeds to step 606 and when it does not, the flow proceeds to step 608.

At step 606, the table management portion 123 sets the software name 401, the version information 402 and the install date/time 403 to the management table 121, and sets the uninstall date/time 404 to "0". When new install is made, the table management portion 123 sets the install status 405 to "1" and sets it to "3" in the case of version-up.

At step 608, the client side communication portion 125 reports the message representing that the install processing of the software in the client 120 is completed, to the server 100.

The content of the message reported to the server 100 at step 608 is the response representing "no empty capacity" when the empty capacity does not exist in the processing at step 603, the response representing "install rejection" when version-up is not made in the processing at step 607, and the install completion report representing the install completion when registration to the management table 121 is made at step 606.

Next, the operation for installing the software registered to the server 100 to the client 120 by the install request from the client 120 will be explained.

FIG. 7 is a flowchart showing the processing procedure of the install processing of the client 120 which transmits the install request.

As shown in FIG. 7, in the install processing of the client 120 transmitting the install request, the client 120 requests the server 100 to install a new software and the requested new software is installed to the client 120.

The install processing shown in FIG. 7 is fundamentally the same as the install processing of the client 120 shown in FIG. 6, but a processing for executing the install request from the client 120 is added to the install processing shown in FIG. 7.

In the client 120, the install request transmission portion 128 transmits the install request to the server 100 at step 701.

The content of the install request transmitted to the server 100 includes the name of the software to be installed, the version and the name of the client 120.

At step 702, the client 120 checks the response content from the server 100 to the install request and examines whether or not the name of the client 120 is registered to the column of the computer name 203 corresponding to the software name 201, for which the install request is generated, and the version information 202 in the history management table 101 of the server 100.

When the name of the client 120 generating the install request is found registered to the history management table 101 of the server 100 as a result of the check of the response content from the server 100 to the install request at step 702, the processing at step 602 et seq. is executed, and when it is not, the install processing in the client 120 is completed.

The explanation of the processing at step 602 and so forth will be omitted because it has already been described with reference to FIG. 6.

FIG. 8 is a flowchart showing the processing procedure of the server 100 receiving the install request.

As shown in FIG. 8, in the install processing of the server 100 receiving the install request, the client 120 requests the server 100 to install a new software, and the new software so requested is installed to the client 120.

The install processing of the server 100 receiving the install request shown in FIG. 8 is fundamentally the same as the install processing of the server 100 shown in FIG. 5, but in the install processing shown in FIG. 8, a processing for accepting the install request from the client 120 and a processing for examining whether or not the name of the requesting client 120 is registered, by checking the history management table 101 are added.

It will be assumed hereby that the software management portion 104 of the server 100 saves the new software in the software storage portion 107 by the processing at step 501 before the install request is transmitted from the client 120.

In the processing at step 502, it will be assumed also that the table management portion 103 of the server 100 inputs the computer name 203 to which install is to be made and the license number 304 of the software from the input device such as the keyboard, registers the computer name 203 to the history management table 101 and the license number 304 to the license number management table 102.

At step 801, the install request reception portion 108 accepts the install request transmitted from the client 120.

At step 802, the table management portion 103 checks the history management table 101 and confirms whether or not the name of the client 120 is registered for the name of the software and the version for which the install request is generated.

At step 803, the server side communication portion 105 reports to the client 120 transmitting the install request whether or not the name of the client 120 is registered to the history management table 101 for the software for which the install request is generated.

The processing after step 505 and so forth, after the report representing whether or not the computer name 203 of the client 120 is registered for the software for which the install request is generated is made, is the same as the explanation of FIG. 5. Therefore, the explanation will be omitted.

In this embodiment, after the processing of step 509 is executed, the flow returns to the processing of step 801, and the next install request from the client 120 is accepted.

When a new licensed program is installed all at once to a plurality of clients, a known multi-cast method is used, and a software name "NET M/D" produced by Hitachi, Ltd., can be used, for example.

Hereinafter, the explanation will be given on the operations of the client 120 and the server 100 when the installed software is deleted and uninstalled from the client 120.

FIG. 9 is a flowchart showing the processing procedure of the uninstall processing of the client 120 in this embodiment.

As shown in FIG. 9, the uninstall processing of the client 120 uninstalls the software installed to the client 120.

First, at step 901, the software management portion 124 in the client 120 deletes the software designated by the user and uninstall of the software is executed.

At step 902, the table management portion 123 of the client searches the software name 401 corresponding to the name of the uninstalled software in the management table 121 of the client, registers the date and time of uninstall to the uninstall date/time corresponding to the software name 401 so searched, and "2" is set to the install status 405.

At the next step 903, the uninstall reporting portion 129 which constitutes an uninstall monitoring means transmits the uninstall information representing uninstall of the designated software, which is obtained by superposing or monitoring uninstall in this way, to the server 100.

The content of the uninstall information transmitted from the client 120 to the server 100 includes the name of the uninstalled software, the version, the name of the client 120 and the uninstall date and time.

Figure 10:
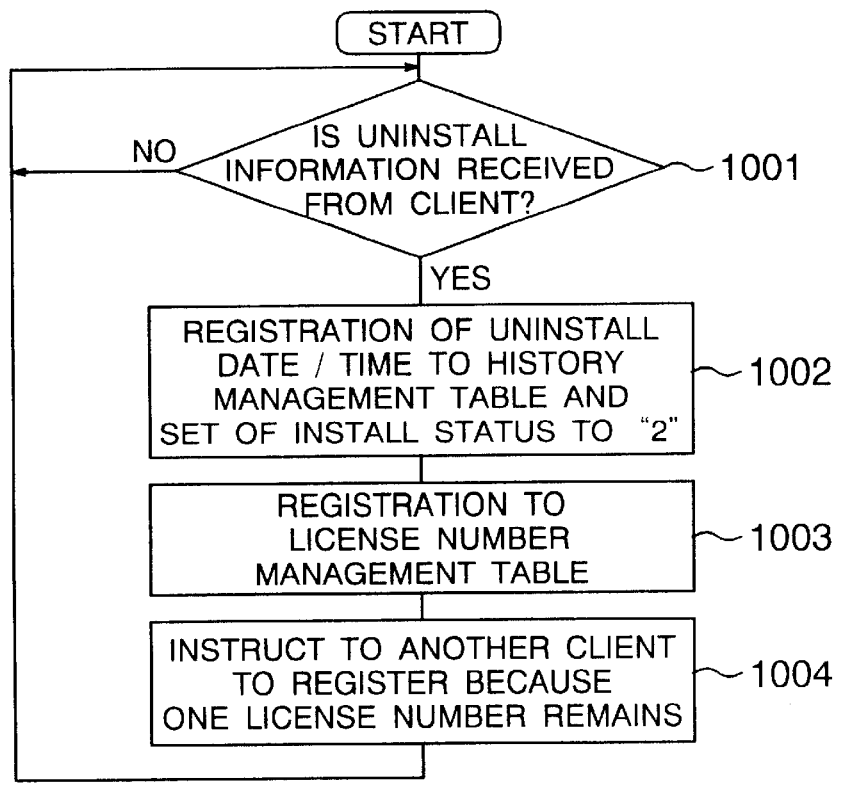
FIG. 10 is a flowchart showing a processing procedure of an uninstall processing of the server 100 in the software management apparatus of the embodiment of the present invention.

FIG. 10 is a flowchart showing the processing procedure of the uninstall processing of the server 100.

As shown in FIG. 10, the uninstall processing of the server 100 represents the processing on the side of the server 100 when the software installed to the client 120 is uninstalled.

At step 1001, the uninstall processing portion 109 in the server 100 is under the loop state until it receives the uninstall information representing uninstall of the software from the client 120. When the install processing portion 109 receives the uninstall information from the client 120, the flow proceeds to the processing of step 1002.

At step 1002, the uninstall processing portion 109 searches the items in the history management table 101 corresponding to the name of the software transmitted from the client 120, the version and the name of the client 120, in the history management table 101, registers the date and time of uninstall transmitted from the client 120 to the uninstall date/time 205 corresponding to the searched items, and sets "2" to the install status 202 corresponding to the searched item.

Next, at step 1003, the uninstall processing portion 109 decrements by "1" the corresponding installed license number 305 in the license number management table 102.

At step 1004, the uninstall processing portion 109 displays a window of a GUI (Graphical User Interface) on the screen or transmits an electronic mail. Because the license number 304 becomes excessive by 1, this processing portion 109 instructs the system manager to register a new client 120.

Hereinafter, the explanation will be given on the operation of the server 100 when the client 120 to which the software is installed is removed from the network.

Figure 11:
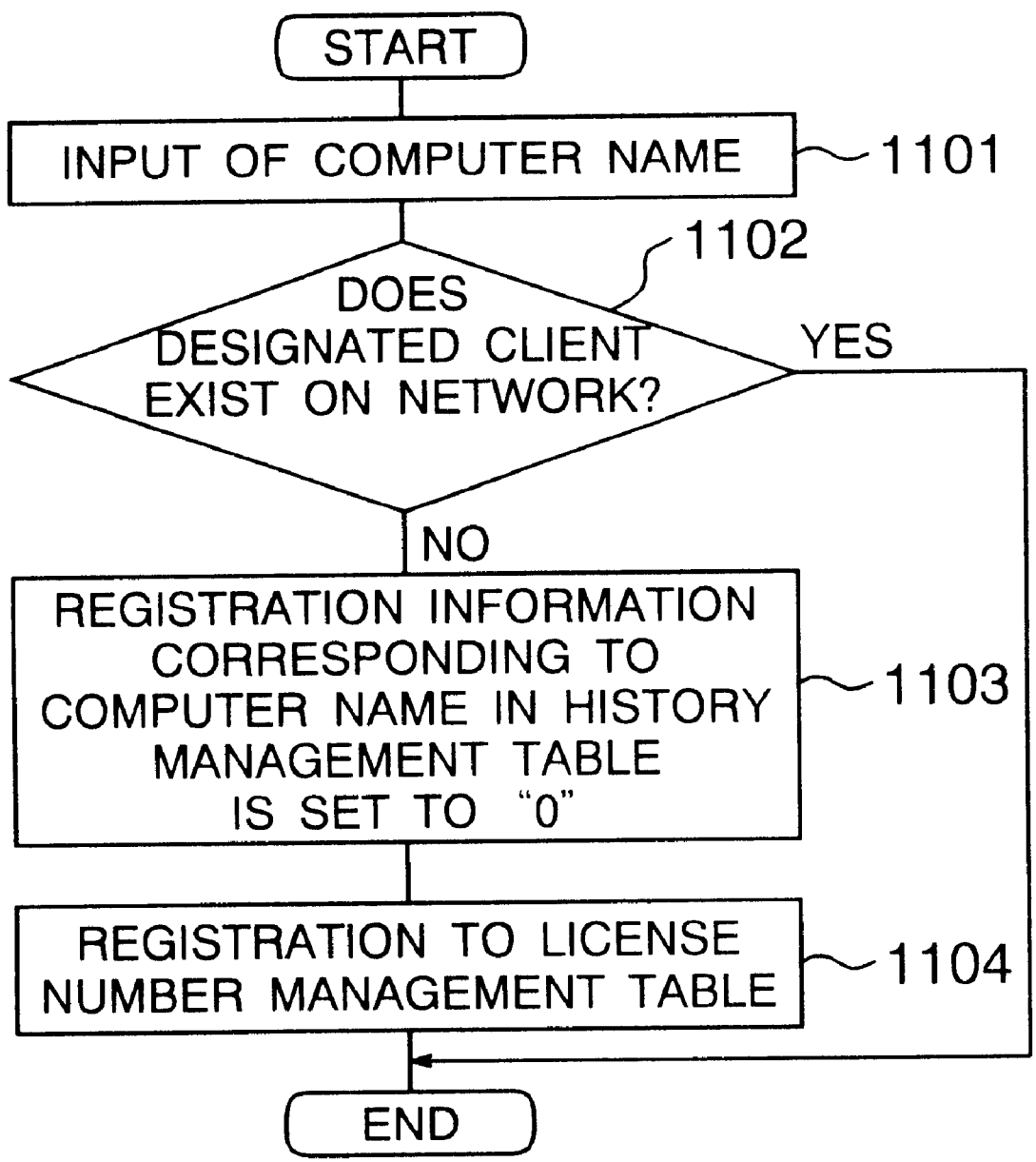
FIG. 11 is a flowchart showing a processing procedure of a registration deletion processing of the client 120 of the software management apparatus of the embodiment of the present invention.

FIG. 11 is a flowchart showing the processing procedure of the registration deletion processing of the client 120 in the software management apparatus of this embodiment.

As shown in FIG. 11, in the registration deletion processing of the client 120, registration of the client 120 is deleted when the client 120, to which the software registered to the server 100 is installed, is removed from the network.

In the server 100, the system manager confirms the removal of the client 120 from the network at step 1101 and inputs the name of the removed client 120 to the server 100.

At step 1102, the registration deletion processing portion 110 of the server 100 searches the client 120 whose name is inputted, on the network, and examines whether or not this client 120 is connected to the network.

In the search of the client 120 described above, an ICMP (Internet Control Message Protocol) is sent on the network, and the client 120 is searched by counting the number of packets to which the response message is returned or by measuring the time before the response message is returned.

When the client 120 whose name is inputted is found connected to the network as a result of the search of the client 120 on the network by the processing at step 1102, the registration deletion processing of the client 120 is completed, and when the client 120 whose name is inputted is not connected to the network, the flow proceeds to the processing of step 1103.

In the processing of step 1103, the registration deletion processing portion 110 sets "0" to the registration information 207 of the history management table 101.

Next, at step 104, the installed license number 305 of the corresponding software of the license number management table 102 is decremented by "1" and the processing is activated from step 502 in FIG. 5.

Figure 12:
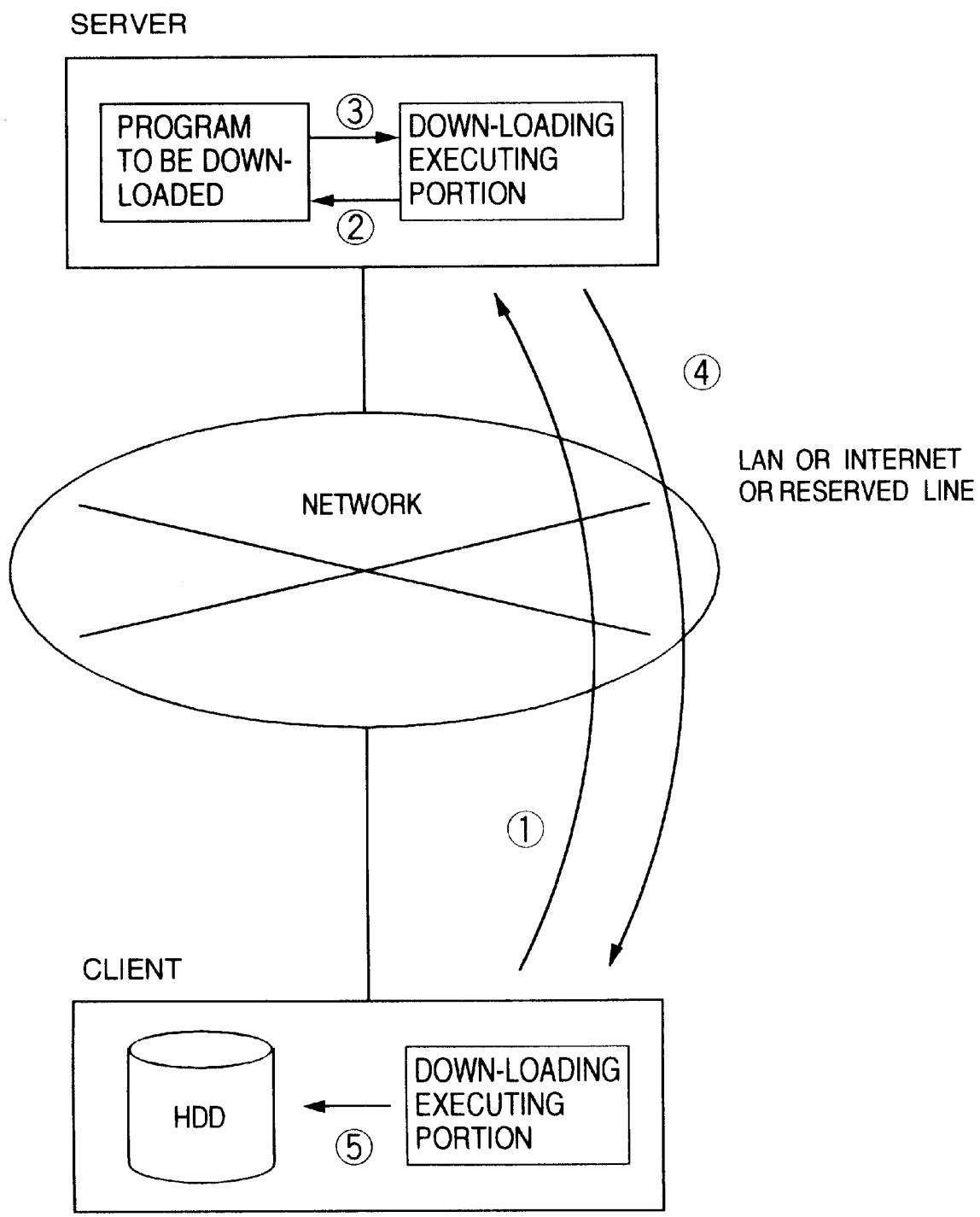
FIG. 12 is an illustration showing an example of management software down-loading from the server to the client.

Incidentally, the install processing, the uninstall processing and the registration deletion processing of the server 100 and the client 120 can be executed by storing an executable programs in a portable storage medium such as a semiconductor memory or a CD-ROM and loading the medium to the computer of each of the server and the client. Instead, they can be executed by different computers by fitting the portable storage medium to other memory devices. Further, management of the licensed software can be made by down-loading the program stored in a medium from outside to each of the server and client computers, as shown in FIG. 12 in which the sequence of program down-loading is indicated by ① to ⑤.

As described above, according to the software management apparatus of this embodiment, the license number of the softwares installed to the client is managed by the server. Therefore, it is possible to prevent a greater number of softwares than the contracted license number from being installed.

Though the present invention has thus been described concretely on the basis of the preferred embodiments thereof, the present invention is not particularly limited thereto but can be naturally changed or modified in various ways without departing from the scope thereof.

What is claimed is:

1. A software management apparatus for managing a license use of a licensed software installed from a server to a client through a network, wherein:

said server comprises a history management table for storing information representing an install history of said software, a license number management table for storing information representing a license number of said software, a software management portion for saving said software to be installed to said client in a software storage portion, a table management portion for registering said information representing the install history of said software and saved in said software storage portion and said information representing the given license number to said history management table and to said license number management portion, respectively, and a software transmission portion for transmitting said software saved in said software storage portion to said client;

said client comprises a software management portion for deciding whether or not said software saved in said server is to be installed, a software reception portion for receiving said software transmitted from said server and storing it into said software storage portion, and a table management portion for registering said information identifying said software saved in said software storage portion to said management table; and wherein said client includes an uninstall reporting portion for supervising uninstall of said software and reporting this uninstall to said server, and said server includes an uninstall processing portion responsive to reception of information from said client indicating that said software is uninstalled, for generating information notifying that a license of the software is available to another client and providing the notifying information.

2. A software management apparatus according to claim 1, wherein said server includes a registration deletion processing portion for deleting said client removed from said network from said history management table.

3. A software management apparatus according to claim 1, wherein said server includes a server side communication portion for reporting that a new software is saved in said software storage portion, to said client to which said software is not yet installed, and said client includes a client side communication portion for receiving a report reporting that said software is saved in said software storage portion.

4. A software management apparatus according to claim 1, wherein said uninstall processing portion in said server generates an electronic mail based on said notifying information and transmits said electronic mail to a preset mail address of a system manager.

5. A client for use in a software management apparatus for managing a license use of a licensed software installed from a server to at least one client through a network, said client comprising:

a software management portion for judging whether or not said software saved in said server is installed;

a software reception portion for receiving said software transmitted from said server and saving it in a software storage portion;

a table management portion for registering information representing said software saved in said software storage portion to a management table; and an uninstall reporting portion for reporting that said software is uninstalled, to said server, which includes an uninstall processing portion responsive to reception of information from said client indicating that said software is uninstalled for generating information notifying that a license of the software is available to another client and providing the notifying information;

wherein information representing the number of the uninstalled softwares is registered to a license number of management table for storing an information representing the license number of said softwares of said server.

6. A software management method according to claim 5, wherein said uninstall processing portion in said server generates an electronic mail based on said notifying information and transmits said electronic mail to a preset mail address of a system manager.

7. A software management method for managing a license use of a licensed software installed from a server to a client through a network, comprising the following steps, in said server:

storing information representing an install history of said software in a history management table;

storing information representing a license number of said software to a license number management table;

saving said software installed to said client in a software storage portion;

registering the information representing the install history of said software saved in said software storage portion and the information representing the license number of said history management table and to said license number management table, respectively;

transmitting said software saved in said software storage portion to said client;

updating said license number management table in response to the information representing uninstall of said software from said client; and comprising the following steps, in said client:

judging whether or not said software saved in said server is to be installed;

receiving said software transmitted from said server and storing it in a software storage portion;

registering information representing said software stored in said software storage portion to a management table; and reporting information representing uninstall of said software when said software is uninstalled, to said server;

wherein said server includes an uninstall processing portion responsive to reception of information from said client indicating that said software is uninstalled, for generating information notifying that a license of the software is available to another client and providing the notifying information.

8. A software management method according to claim 7, wherein said network, said server and said client constitute a closed server-client system environment.

9. A software management method according to claim 7, wherein the uninstall operation of said software is supervised and the result of supervision of uninstall is reported to said server, in said client, and said license number management table corresponding to said software is updated in response to the report of the supervision result, in said server.

10. A software management method according to claim 7, wherein said uninstall processing portion in said server generates an electronic mail based on said notifying information and transmits said electronic mail to a preset mail address of a system manager.

11. In a computer readable recording medium for storing a program for executing a management operation of a license use of a software installed from a server to a client through a network, said program comprising, in said server:

code means for storing information representing an install history of said software to a history management table;

code means for storing an information representing a license number of aid software in a license number management table;

code means for saving said software installed to said client in a software storage portion;

code means for registering the information representing the install history of said software and saved in said software storage portion and the information representing the license number to said history management table and to said license number management table, respectively;

code means for transmitting said software saved in said software storage portion to said client; and code means for updating said license number management table in response to the information representing uninstall of said software, from said client; and comprising in said client:

code means for judging whether or not said software saved in said server is to be installed;

code means for receiving said software transmitted from said server and storing it in a software storage portion;

code means for registering information representing said software stored in said software storage portion to a management table; and code means for reporting uninstall of said software when said software is uninstalled, to said server, which includes an uninstall processing portion responsive to reception of information from said client indicating that said software is uninstalled for generating information notifying that a license of the software is available to another client and providing the notifying information.

12. A recording medium according to claim 11, which further comprises, on the side of said client, code means for supervising the uninstall operation of said software and reporting the supervision result of uninstall to said server, and comprises, on the side of said server, code means for updating said license number management table corresponding to said client, in response to the report of the supervision result.

13. A recording medium according to claim 11, wherein said uninstall processing portion in said server generates an electronic mail based on said notifying information and transmits said electronic mail to a preset mail address of a system manager.

14. A software management apparatus for managing a license use of a licensed software installed from a server to a client through a network, wherein:

said server comprises a history management table for storing information representing an install history of said software, a license number management table for storing information representing a license number of said software, a software management portion for saving said software to be installed to said client in a software storage portion, a table management portion for registering said information representing the install history of said software and saved in said software storage portion and said information representing the given license number to said history management table and to said license number management portion, respectively, and a software transmission portion for transmitting said software saved in said software storage portion to said client;

said client comprises a software management portion for deciding whether or not said software saved in said server is to be installed, a software reception portion for receiving said software transmitted from said server and storing it into said software storage portion, and a table management portion for registering said information identifying said software saved in said software storage portion to said management table; and wherein said client includes an uninstall reporting portion for supervising uninstall of said software and reporting this uninstall to said server, and said server includes an uninstall processing portion responsive to reception of information from said client indicating that said software is uninstalled, for generating information notifying that a license of the software is available to another client and providing the notifying information to a system manager in said server.

15. A software management apparatus according to claim 14, wherein said server includes a registration deletion processing portion for deleting said client removed from said network from said history management table.

16. A software management apparatus according to claim 14, wherein said uninstall processing portion in said server generates an electronic mail based on said notifying information and transmits said electronic mail to a preset mail address of said system manager.

* * * * *